United States Patent
Narasimhan et al.

(10) Patent No.: US 12,081,435 B2
(45) Date of Patent: Sep. 3, 2024

(54) DISTRIBUTION OF SRV6 MODES OF OPERATION VIA ROUTING PROTOCOLS

(71) Applicant: Ciena Corporation, Hanover, MD (US)

(72) Inventors: Ashwath Narasimhan, Milpitas, CA (US); Muthurajah Sivabalan, Kanata (CA); Tao Wang, Ottawa (CA); Lakshmi Rajasekaran, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/070,642

(22) Filed: Nov. 29, 2022

(65) Prior Publication Data

US 2024/0179091 A1    May 30, 2024

(51) Int. Cl.
    *H04L 45/74*    (2022.01)
(52) U.S. Cl.
    CPC ................................. *H04L 45/74* (2013.01)
(58) Field of Classification Search
    CPC ...................................................... H04L 45/74
    USPC ........................................................ 709/242
    See application file for complete search history.

(56) References Cited

U.S. PATENT DOCUMENTS

| | | | |
|---|---|---|---|
| 7,120,792 | B1 | 10/2006 | Jacobson et al. |
| 7,197,573 | B1 | 3/2007 | Jacobson et al. |
| 7,430,176 | B2 | 9/2008 | Nalawade et al. |
| 7,539,191 | B1 | 5/2009 | Jacobson |
| 7,684,351 | B2 | 3/2010 | Vasseur et al. |
| 8,135,834 | B1 | 3/2012 | Jacobson et al. |
| 8,274,901 | B1 | 9/2012 | Casner et al. |
| 8,422,502 | B1 | 4/2013 | Alaettinoglu et al. |
| 8,824,331 | B1 | 9/2014 | Alaettinoglu et al. |
| 8,937,946 | B1 | 1/2015 | Kanna et al. |
| 9,531,642 | B1 * | 12/2016 | Giacalone ............. H04L 45/123 |
| 9,979,629 | B2 | 5/2018 | Sivabalan et al. |
| 10,033,623 | B2 | 7/2018 | Jain et al. |

(Continued)

FOREIGN PATENT DOCUMENTS

| | | |
|---|---|---|
| CN | 113 794 637 B | 10/2022 |
| EP | 3 038 301 B1 | 3/2020 |

(Continued)

OTHER PUBLICATIONS

Micro SIDs: A Solution for Efficient Representation of Segment IDs in SRv6 Networks Marco Bonola; Ahmed Abdelsalam; Pablo Camarillo; Darren Dukes; Francois Clad; Clarence Filsfils IEEE Transactions on Network and Service Management Year: 2023 | vol. 20, Issue: 1 Journal Article | Publisher: IEEE (Year: 2023).*

(Continued)

*Primary Examiner* — Jeffrey R Swearingen
(74) *Attorney, Agent, or Firm* — Baratta Law PLLC; Lawrence A. Baratta, Jr.

(57) ABSTRACT

A node in a segment routing version 6 (SRv6) network includes circuitry configured to transmit and receive packets in the SRv6 network with a segment routing header (SRH) that supports one or more of a Reduced mode and a Non-reduced mode, transmit via transmitted routing updates to one or more nodes in the SRv6 network which of the one or more of the Reduced mode and the Non-reduced mode are supported by the node, and receive via received routing updates from the one or more nodes their corresponding support for the one or more of the Reduced mode and the Non-reduced mode.

15 Claims, 7 Drawing Sheets

(56) References Cited

U.S. PATENT DOCUMENTS

| | | |
|---|---|---|
| 10,158,558 B1 | 12/2018 | Ward et al. |
| 10,165,093 B2 | 12/2018 | Filsfils et al. |
| 10,171,338 B2 | 1/2019 | Filsfils et al. |
| 10,250,494 B2 | 4/2019 | Sivabalan et al. |
| 10,277,558 B2 | 4/2019 | Khan et al. |
| 10,291,516 B2 | 5/2019 | Bryant et al. |
| 10,454,821 B2 | 10/2019 | Filsfils et al. |
| 10,567,295 B2 | 2/2020 | Barton et al. |
| 10,740,408 B2 | 8/2020 | Ramasamy et al. |
| 10,833,976 B2 | 11/2020 | Saad et al. |
| 10,868,755 B2 | 12/2020 | Filsfils et al. |
| 11,057,278 B1 | 7/2021 | Côté et al. |
| 11,102,109 B1 | 8/2021 | Narasimhan et al. |
| 2004/0037222 A1* | 2/2004 | Kim .................... H04M 1/2535 370/352 |
| 2015/0271034 A1 | 9/2015 | Kanna et al. |
| 2016/0057049 A1 | 2/2016 | Jacobson et al. |
| 2016/0191324 A1 | 6/2016 | Olofsson et al. |
| 2019/0297017 A1 | 9/2019 | Pignataro et al. |
| 2019/0379601 A1 | 12/2019 | Khan et al. |
| 2020/0112495 A1 | 4/2020 | Attarwala et al. |
| 2020/0153856 A1 | 5/2020 | Nainar et al. |
| 2020/0220811 A1 | 7/2020 | Shah |
| 2021/0092043 A1 | 3/2021 | Filsfils et al. |
| 2021/0160174 A1 | 5/2021 | Kashyap et al. |
| 2021/0243095 A1 | 8/2021 | Attarwala et al. |
| 2021/0392034 A1 | 12/2021 | Boutros et al. |
| 2022/0053072 A1* | 2/2022 | Filsfils .................... H04L 45/74 |
| 2022/0141120 A1* | 5/2022 | Dong ....................... H04L 45/50 370/401 |

FOREIGN PATENT DOCUMENTS

| | | | |
|---|---|---|---|
| WO | WO-2021021172 A1 * | 2/2021 | ............ H04L 45/00 |
| WO | 2021/0967231 A1 | 4/2021 | |

OTHER PUBLICATIONS

RFC 8986: Segment Routing over IPv6 (SRv6 Network Programming. Filsfils et al. Feb. 2021. 40 pages. (Year: 2021).*

C. Filsfils et al., "IPV6 Segment Routing Header (SRH)," Internet Engineering Task Force (IETF), Standards Track, ISSN: 2070-1721, Mar. 2020, 17 pages.

Feb. 9, 2024, International Search Report and Written Opinion for International Patent Application No. PCT/US2023/035208.

* cited by examiner

DISTRIBUTION OF SRV6 MODES OF OPERATION VIA ROUTING PROTOCOLS

FIELD OF THE DISCLOSURE

The present disclosure relates generally to networking and computing. More particularly, the present disclosure relates to systems and methods for distribution of segment routing version 6 (SRv6) modes of operation via routing protocols.

BACKGROUND OF THE DISCLOSURE

Segment Routing over Internet Protocol version 6 (IPv6) (SRv6) is based on source routing paradigm where the topological and service path is encoded in the IPV6 packet header, and a new type of routing header called Segment Routing Header (SRH). See, e.g., RFC 8986, "Segment Routing IPV6 (SRv6) Network Programming," February 2021, and RFC 8754, "IPv6 Segment Routing Header (SRH)," March 2020, the contents of which are incorporated by reference in their entirety. A segment is encoded as an IPV6 address. An ordered list of segments is encoded as an ordered list of IPV6 addresses in the SRH. The active segment is indicated by the Destination Address (DA) of the packet. The next active segment is indicated by a pointer in the new routing header. SRv6 can operate in two modes, namely 1) Reduced Mode, and 2) Non-Reduced Mode. Conventionally, network operators pre-determine the mode they want to support using a global configuration. Once the mode is set, a device (i.e., network element, router, etc.) cannot dynamically operate in the other mode. Both modes do not simultaneously exist on a device.

BRIEF SUMMARY OF THE DISCLOSURE

The present disclosure relates to systems and methods for distribution of segment routing version 6 (SRv6) modes of operation via routing protocols. Further, the present disclosure allows a given device (i.e., a network element, a router, and the like) to operate in different modes on different links. In an embodiment, the flags field in updates, such as interior gateway protocol (IGP)/border gateway protocol link state (BGP-LS) updates, are used to exchange Reduced mode and Non-Reduced mode operational capabilities of network devices. This allows devices to explicitly associate Reduced or Non-Reduced mode with a locator to support both modes simultaneously. It is also possible to allow head-ends of SR policies to construct optimal Segment Identifier (SID) lists taking into considerations other devices capabilities with respect to Reduced and Non-Reduced modes. Advantageously, the present disclosure provides network operators flexibility to support heterogeneous network elements in a same network.

In an embodiment, a node in a segment routing version 6 (SRv6) network includes circuitry configured to transmit and receive packets in the SRv6 network with a segment routing header (SRH) that supports one or more of a Reduced mode and a Non-reduced mode, transmit via transmitted routing updates to one or more nodes in the SRv6 network which of the one or more of the Reduced mode and the Non-reduced mode are supported by the node, and receive via received routing updates from the one or more nodes their corresponding support for the one or more of the Reduced mode and the Non-reduced mode.

The circuitry can be further configured to transmit packets to any of the one or more nodes with a SRH utilizing the corresponding support for the one or more of the Reduced mode and the Non-reduced mode. The circuitry can be further configured to construct a segment identifier (SID) list to the one or more nodes based on the corresponding support for the one or more of the Reduced mode and the Non-reduced mode. The node can support both the Reduced mode and the Non-reduced mode. The circuitry can be further configured to transmit packets to a first node of the one or more nodes with a SRH utilizing the Reduced mode, and transmit packets to a first node of the one or more nodes with a SRH utilizing the Non-reduced mode.

The transmitted and the received routing updates can include flags having values set based on the one or more of the Reduced mode and the Non-reduced mode that are supported by the node. The transmitted and the received routing updates can be via any of intermediate system-intermediate system (ISIS), open shortest path first (OSPF), interior gateway protocol (IGP), and border gateway protocol link state (BGP-LS). The transmitted and the received routing updates can include a type-length-value (TLV) or sub-TLV. The transmitted and the received routing updates can include a SRv6 locator with the one or more of the Reduced mode and the Non-reduced mode that are supported by the node indicated therein.

In another embodiment, a non-transitory computer-readable medium include instructions that, when executed, cause circuitry to perform steps of transmitting and receiving packets in a segment routing version 6 (SRv6) network with a segment routing header (SRH) that supports one or more of a Reduced mode and a Non-reduced mode, transmitting via transmitted routing updates to one or more nodes in the SRv6 network which of the one or more of the Reduced mode and the Non-reduced mode are supported by the node, and receiving via received routing updates from the one or more nodes their corresponding support for the one or more of the Reduced mode and the Non-reduced mode.

In a further embodiment, a method includes steps of transmitting and receiving packets in a segment routing version 6 (SRv6) network with a segment routing header (SRH) that supports one or more of a Reduced mode and a Non-reduced mode, transmitting via transmitted routing updates to one or more nodes in the SRv6 network which of the one or more of the Reduced mode and the Non-reduced mode are supported by the node, and receiving via received routing updates from the one or more nodes their corresponding support for the one or more of the Reduced mode and the Non-reduced mode.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for distribution of segment routing version 6 (SRv6) modes of operation via routing protocols. Further, the present disclosure allows a given device (i.e., a network element, a router, and the like) to operate in different modes on different links. In an embodiment, the flags field in updates, such as interior gateway protocol (IGP)/border gateway protocol link state (BGP-LS) updates, are used to exchange Reduced mode and Non-reduced mode operational capabilities of network devices. This allows devices to explicitly associate Reduced or Non-Reduced mode with a locator to support both modes simultaneously. It is also possible to allow head-ends of SR policies to construct optimal Segment Identifier (SID) lists taking into considerations other devices capabilities with respect to Reduced and Non-Reduced modes. Advantageously, the present disclosure provides network operators flexibility to support heterogeneous network elements in a same network Segment Routing Overview Segment Routing (SR) is a technology that implements a source routing paradigm. A packet header includes a stack of function identifiers, known as segments, which define an ordered list of functions to be applied to the packet. A segment can represent any instruction, topological, or service-based. A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. Segment Routing is described, e.g., in Fiflsfils et al., RFC 8402, "Segment Routing Architecture," Internet Engineering Task Force (IETF), July 2018, the contents of which are incorporated herein by reference. A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published in July 2015 as draft-previdi-6man-segment-routing-header (available online at tools.ietforg/html/draft-previdi-6man-segment-routing-header-08) and RFC 8754, "IPv6 Segment Routing Header (SRH)," March 2020, the contents of both are incorporated by reference herein. A segment is encoded as an IPV6 address. An ordered list of segments is encoded as an ordered list of IPV6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPV6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each Segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types—an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by intermediate system-intermediate system (ISIS) or open shortest path first (OSPF). The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Engine (PCE) (e.g., when paths span across multiple IGP areas/levels).

uSID

The SIDs described herein so far can be referred to as classical or uncompressed SIDs. There is a micro-SID (uSID) implementation that enables compression of the SRv6 header (SRH). Example description of the uSID is provided in Filsfils et al., draft-filsfils-spring-net-pgm-extension-srv6-usid-13, "Network Programming extension: SRv6 uSID instruction," 13 Jun. 2022, and A. Tulumello et al., "Micro SIDs: a solution for Efficient Representation of Segment IDs in SRv6 Networks," 2020 16th International Conference on Network and Service Management (CNSM), 2020, pp. 1-10, doi: 10.23919/CNSM50824.2020.9269075, the contents of each are incorporated by reference in their entirety.

SRv6 Modes

Again, SRv6 can operate in two modes, namely 1) Reduced Mode, and 2) Non-Reduced Mode. The conventional approach includes manual configuration by an operator, homogenous configuration in a network, i.e., all network elements utilize the same mode, the standards do not support sharing mode capabilities, there is no dynamic configuration of modes, and a single network element cannot operate in different modes simultaneously on different links. The present disclosure addresses these limitations.

Figure 1:
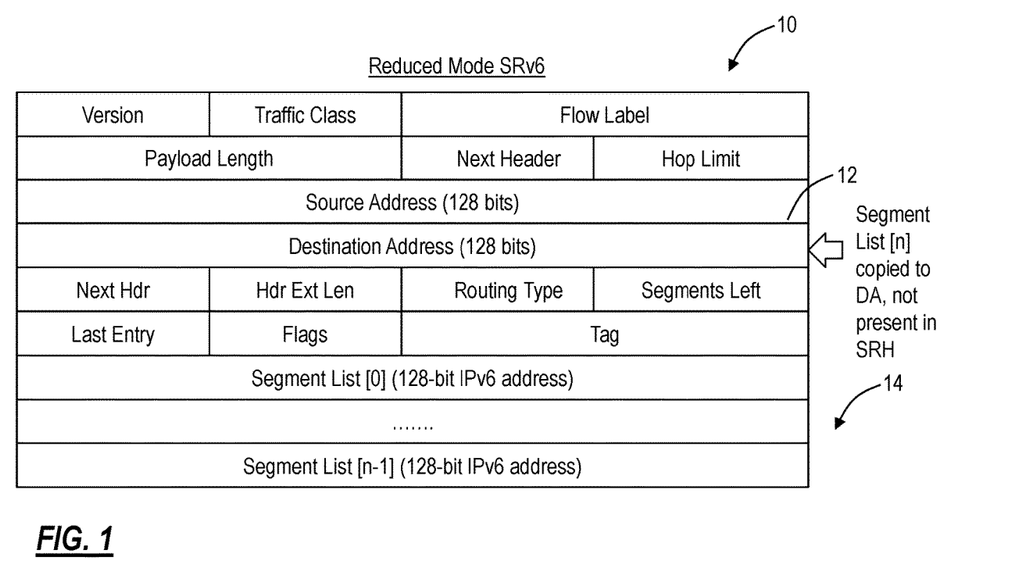
FIG. 1 is a diagram of a Reduced Mode SRv6 header (SRH).
Figure 2:
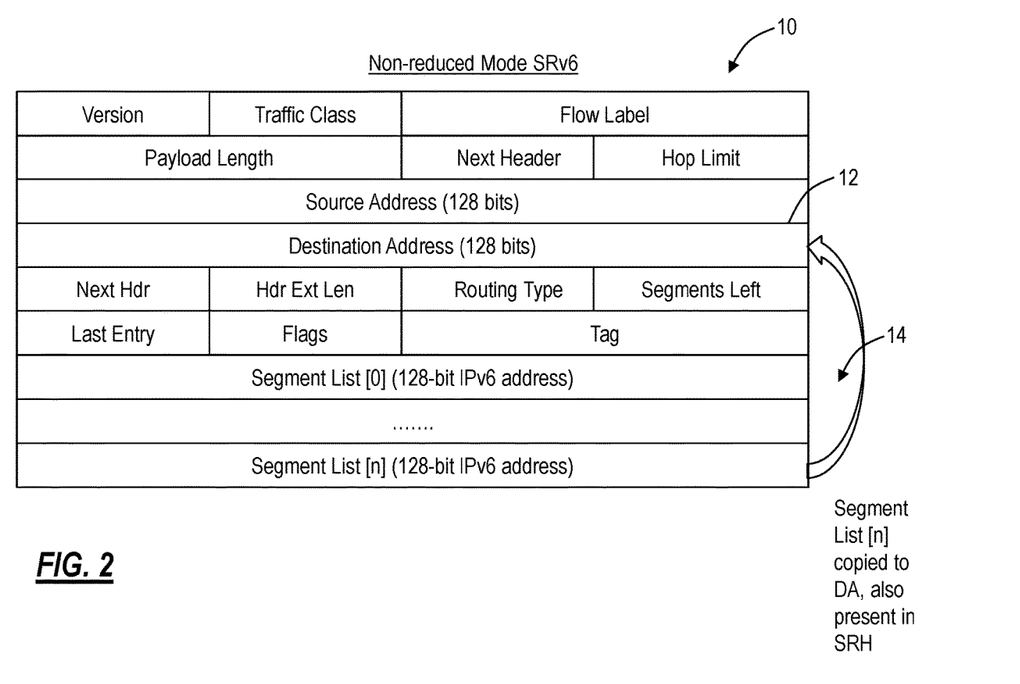
FIG. 2 is a diagram of a Non-Reduced Mode SRv6 header (SRH).

FIG. 1 is a diagram of a Reduced Mode SRv6 header (SRH) 10. FIG. 2 is a diagram of a Non-Reduced Mode SRv6 header (SRH) 10. The SRH 10 is a data structure that is appended to a packet, and it includes various fields as are known in the art. For brevity, these various fields are not described in detail and are described in RFC 8754, "IPv6 Segment Routing Header (SRH)," March 2020. For the different modes, there is a Destination Address (DA) field 12 which can be used to reduce a size of the overall SRH 10 in the Reduced Mode. The SRH 10 also includes a segment list 14 which includes the Segment Identifiers (SIDs). In the 'Reduced Mode', the size of the SRH 10 is decremented by one Segment Identifier (SID). This is achieved by excluding the last SID from the SRH 10 of the IPV6 Packet header because it is placed in the Destination Address field 2 of the IPv6 packet header, and the packet is forwarded to the destination address directly. In this mode the source does not require the entire SID list to be preserved in the SRH 10. Devices that operate in the 'Reduced mode' use a smaller packet size because of the absence of the SRH. The 'Reduced Mode' is especially useful in conjunction with a micro-SID (uSID). In the 'Non-Reduced Mode', the entire SID list is stored in the SRH 10.

Figure 3:
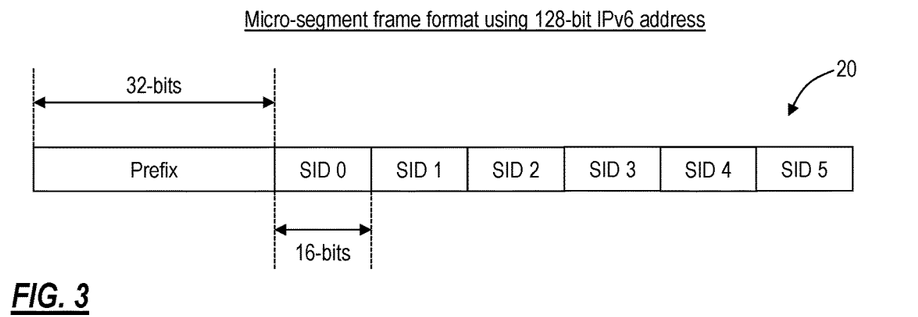
FIG. 3 is a diagram of a micro-Segment frame format using a 128-bit IPv6 Address.

An uncompressed SRv6 SID is 128-bit long. The SRv6 architecture supports the ability to carry multiple smaller SIDs called micro-SIDs (uSIDs) in a 128 uncompressed SID. Such ability leads to reduced MTU overhead hen associated with uncompressed SIDs. A uSID can be 16-bit long. The 128-bit IPv6 address shares a common prefix and a number of uSIDs as shown in FIG. 3 which is a diagram of a micro-Segment Frame Format 20 using a 128-bit IPv6 Address. In the example of FIG. 3, the common prefix is 32 bits long.

Figure 4:
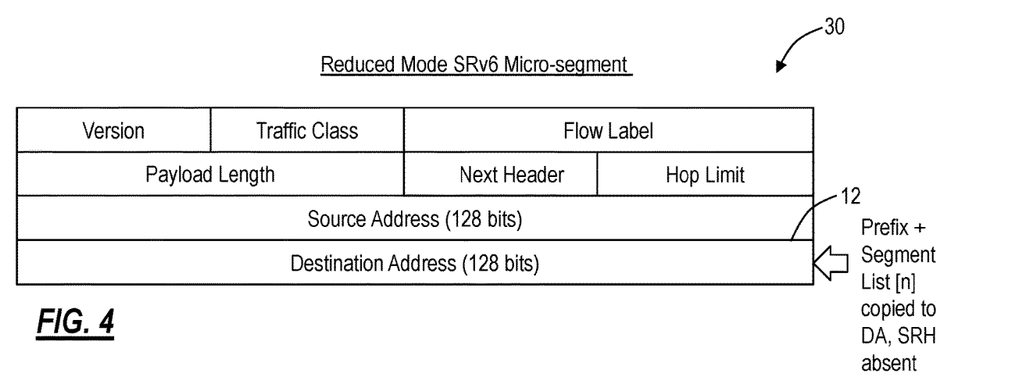
FIG. 4 is a diagram of a Reduced Mode SRv6 micro-Segment frame format.
Figure 5:
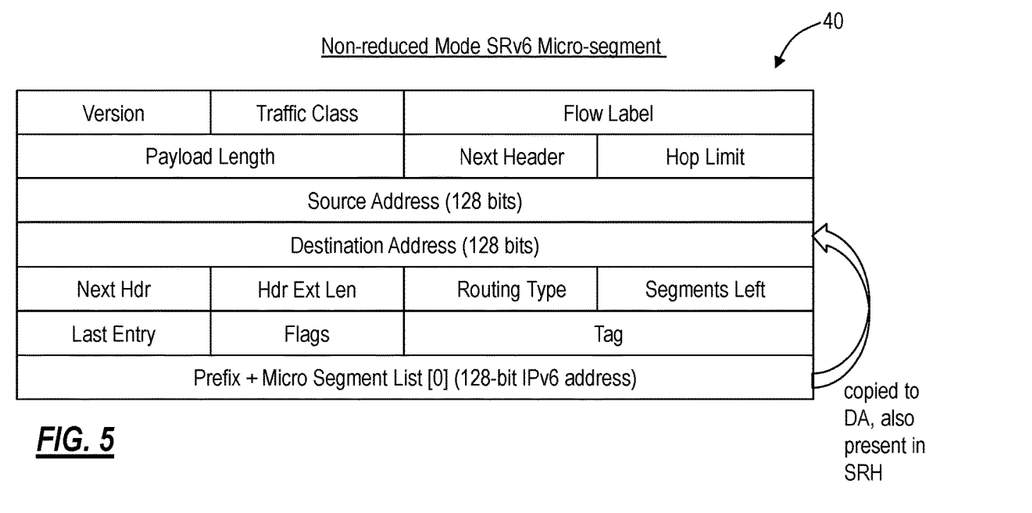
FIG. 5 is a diagram of a Reduced Mode SRv6 micro-Segment frame format.

In the case of SRv6 network programming model that uses the uSID based mechanism, a frame format 30 of 'Reduced mode' is shown in FIG. 4. As shown in FIG. 4, the common 32-bit prefix and the SID list containing 16-bit segments are copied to the Ipv6 Header's Destination Address 12. In the case where the SID list contains more than six 16-bit segments, one or more SRH(s) shall be appended to the IPV6 header, and the remaining segments are encoded using the same strategy in the SRH. FIG. 5 is a diagram of a Reduced Mode SRv6 micro-Segment frame format 40.

Note

Although this document references a uSID for the various descriptions, those skilled in the art will recognize the various techniques described herein relative to the Reduced mode and the Non-reduced mode contemplate implementation with any type of SID, including, for example, compressed SID, uncompressed SID, Generalized SID (gSID), etc.

Problem

Again, the current SRv6 standard assumes that devices (i.e., nodes, network elements, routers, etc.) in the topology either operate entirely in 'Reduced mode' or in 'non-Reduced mode'. However, this assumption makes it difficult to deploy SRv6 on devices with different capabilities and from different equipment vendors.

Solution

The present disclosure proposes that 'Reduced' or 'Non-Reduced' mode capability, of each device, be exchanged between devices via routing updates thereby allowing the devices to determine the per-hop behavior.

Figure 6:
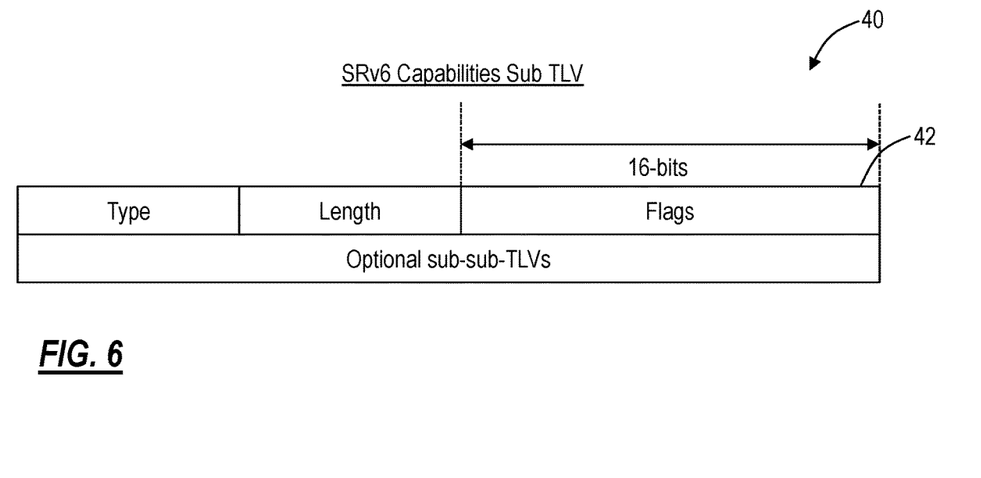
FIG. 6 is a diagram of a SRv6 capabilities Type-Length-Value (TLV) for advertising SRv6 capabilities.

FIG. 6 is a diagram of a SRv6 capabilities Type-Length-Value (TLV) 40 for advertising SRv6 capabilities. The SRv6 capabilities TLV 40 can be used in routing updates in OSPF, ISIS and BGP-LS. Also, the SRv6 capabilities can include operability in the Reduced mode, Non-reduced mode, or an ability to do both. Of note, the following TLVs, flags, etc. are one example embodiment of how to advertise and determine capabilities. Those skilled in the art will appreciate other techniques are contemplated.

Figure 7:
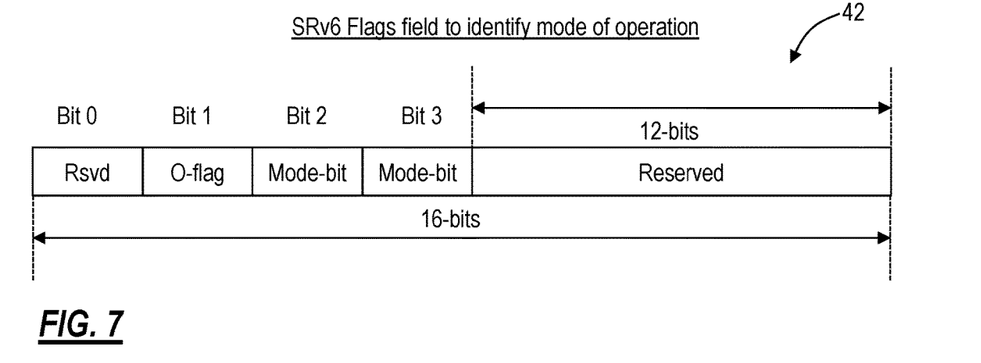
FIG. 7 is a diagram of SRv6 flags in the SRv6 TLV of FIG. 6 to identify mode of operation.

In an embodiment, the present disclosure proposes a Flags field 42 be extended to include the 'mode' bits that would indicate the type of mode the device supports. An example embodiment is shown in FIG. 7. Here, Bit 2 and Bit 3 can represent the 'mode' bits. If Bit 2 is set to '1', then this indicates that the device is capable of operating in 'Non-Reduced mode' only. If Bit 3 is set to '1', then this indicates that the device can operate in 'Reduced mode' only. If both Bit 2 and Bit 3 are set to '1' then this indicates that the device can operate in both the modes. By default, if these bits are not set to '1', then it can be assumed that the device is only capable of operating in 'Reduced mode'. Again, this is only one example, and other combinations are contemplated.

Locator TLV

Figure 8:
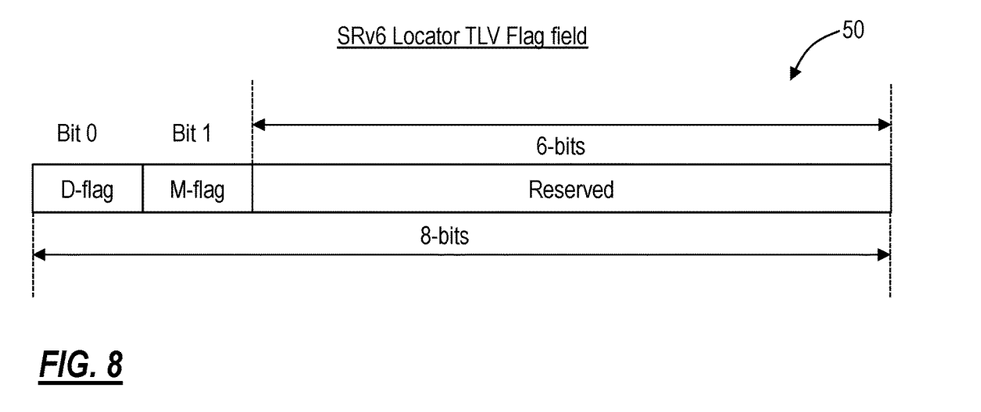
FIG. 8 is a diagram of a SRv6 Locator TLV.

FIG. 8 is a diagram of a SRv6 Locator TLV 50. The Locator TLV 50 is used to advertise SRv6 Locators. Locators include a block identifier and node identifier, and it identifies the device uniquely. In an embodiment, the present disclosure proposes to use a different locator to represent each mode. This is done by modifying the Flag field in the Locator TLV to determine the mode associated with the locator as shown in FIG. 8. For example, if the M-flag is set to '1' then it indicates that the configured locator is associated with Non-Reduced Mode. If the M-flag is set to '0' then it indicates that the configured locator is associated with Reduced Mode. Again, this is only one example, and other combinations are contemplated.

The present disclosure proposes that devices that support both modes can advertise multiple locators using the SRv6 Locator TLV 50. Some of these are for 'Reduced' mode and others are for 'Non-Reduced' mode.

Operation

The present disclosure proposes that the SR-Policy head-end can use the proposed extensions to build an appropriate SID list. The next sub-sections clarify this using an example.

Reduced-Mode Operation

Figure 9:
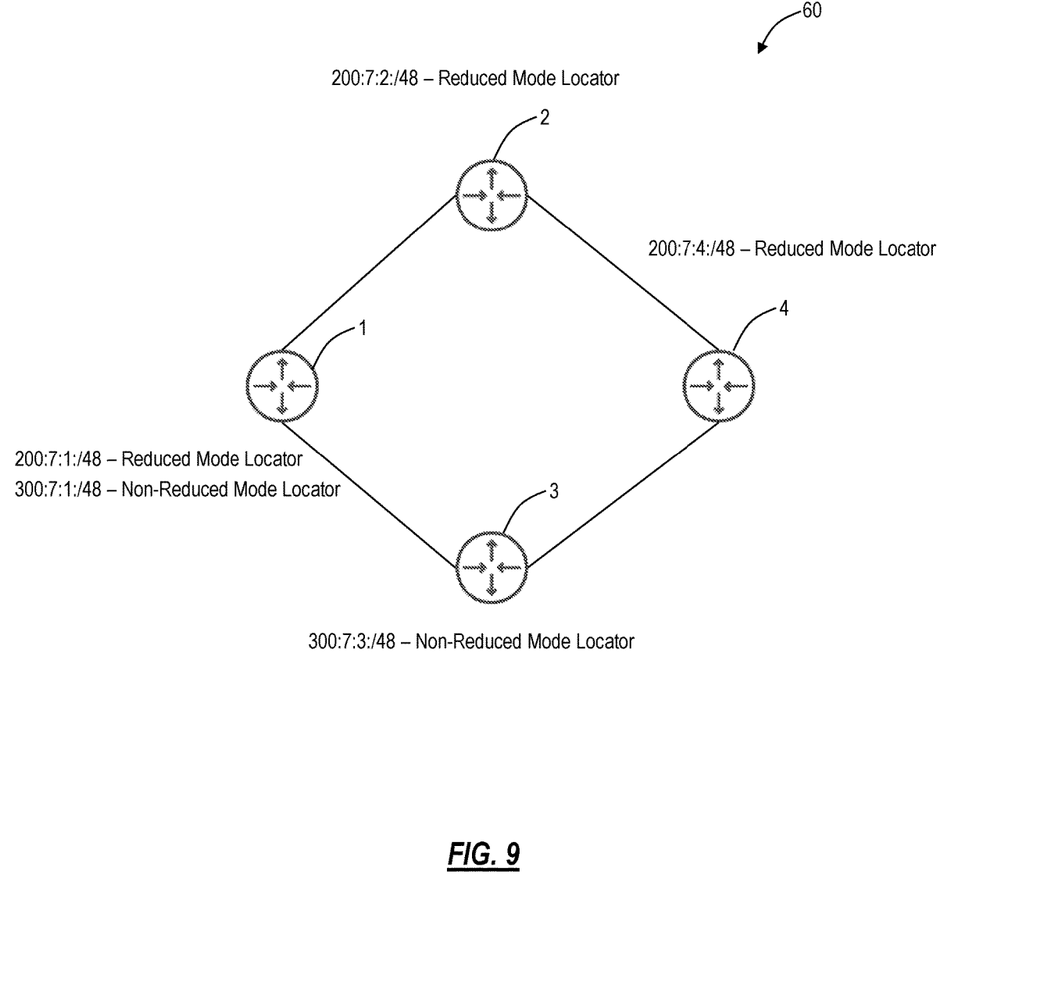
FIG. 9 is a network diagram of a network illustrating SRv6 Topology Traffic in Reduced Mode.

FIG. 9 is a network diagram of a network 60 illustrating SRv6 Topology Traffic in Reduced Mode. The network 60, for illustration purposes, includes four devices connected to each other. 'Device 1' can operate in both 'Reduced' and 'Non-Reduced' modes. 'Device 2' can operate only in 'Reduced Mode'. 'Device 3' is capable of operating in only 'Non-Reduced mode'. 'Device 4' can operate only in 'Reduced Mode'. 'Device 1' assigns two locators, one for each of the modes as shown. While all other devices only assign 1 locator for the mode they support as shown.

When 'Device 4' wants to send traffic to 'Device 1', it will pick the policy with end-point destination address as 200:7:1::/48 since 'Device 4' is operating in 'Reduced mode'. Note that 'Device 1' supports both the modes with 200:7:1::/48 representing the locator associated with 'Reduced' mode. 'Device 4' could also pick a policy that contains 'Device 2' as one of the SID hops in the SID list since 'Device 2' also supports 'Reduced' mode.

Non-Reduced Mode Operation

Figure 10:
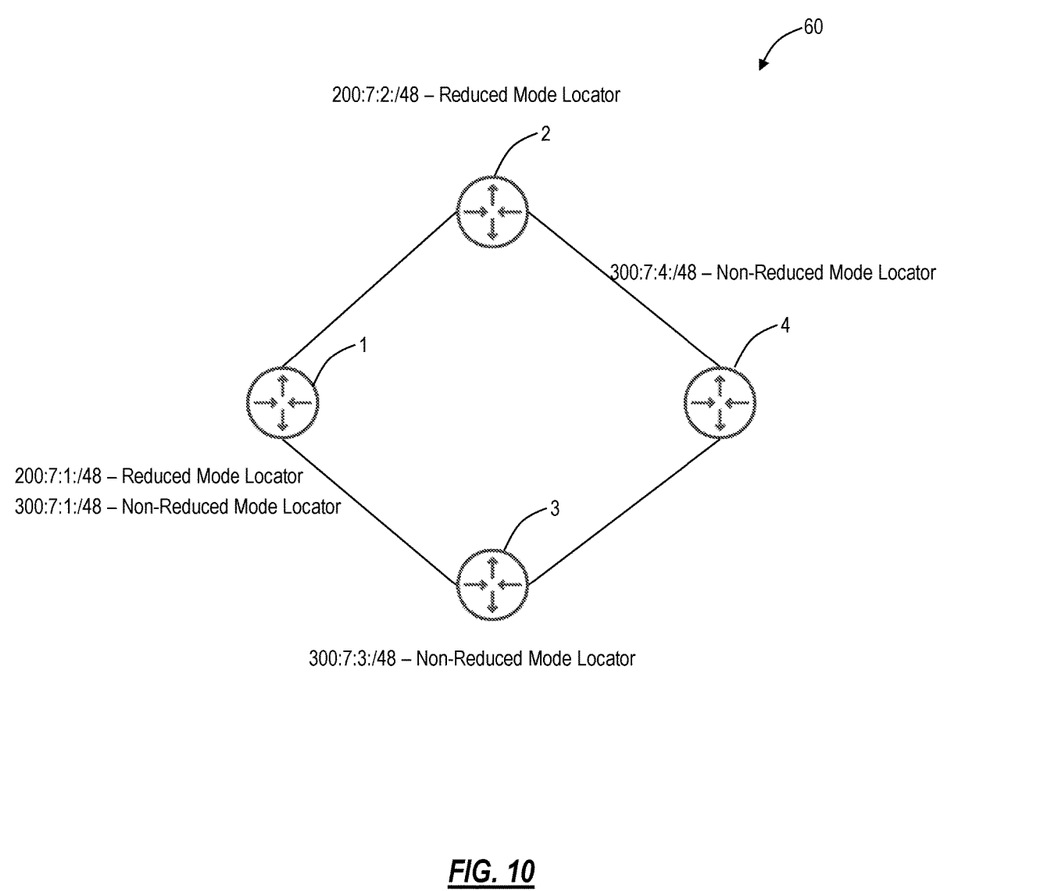
FIG. 10 is a network diagram of the network illustrating SRv6 Topology Traffic in Non-reduced Mode.

FIG. 10 is a network diagram of the network 60 illustrating SRv6 Topology Traffic in Non-reduced Mode. 'Device 1' can operate in both 'Reduced' and 'Non-Reduced' modes. 'Device 2' can operate only in 'Reduced Mode'. 'Device 3' is capable of operating in only 'Non-Reduced mode'. 'Device 4' can operate only in 'Non-Reduced Mode'. 'Device 1' assigns two locators, one for each of the modes as shown. While all other devices only assign 1 locator for the mode they support as shown.

When 'Device 4' wants to send traffic to 'Device 1', it will pick the policy with end-point destination address as 300:7:1::/48 since 'Device 4' is operating in 'Non-Reduced mode'. Note that 'Device 1' supports both the modes with 300:7:1::/48 representing the locator associated with 'Non-Reduced' mode. 'Device 4' could also pick a policy that contains 'Device 3' as one of the SID hops in the SID list since 'Device 3' also supports 'Non-Reduced' mode.

Example Node

Figure 11:
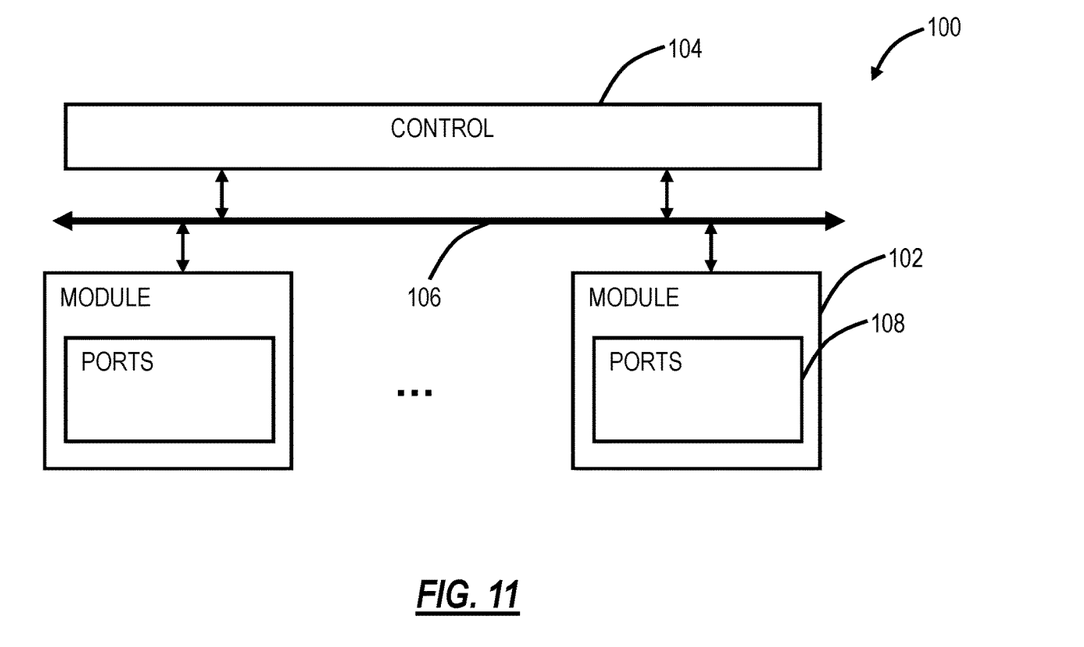
FIG. 11 is a block diagram of an example implementation of a node, such as for the devices in the network in FIGS. 9 and 10.

FIG. 11 is a block diagram of an example implementation of a node 100, such as for the devices 1, 2, 3, 4 in the network 60. Those of ordinary skill in the art will recognize FIG. 11 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the PCE, the SDN controller, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 11 is meant to provide a functional view, and those of ordinary skill in the art will recognize actual hardware implementations may vary.

Example Controller

Figure 12:
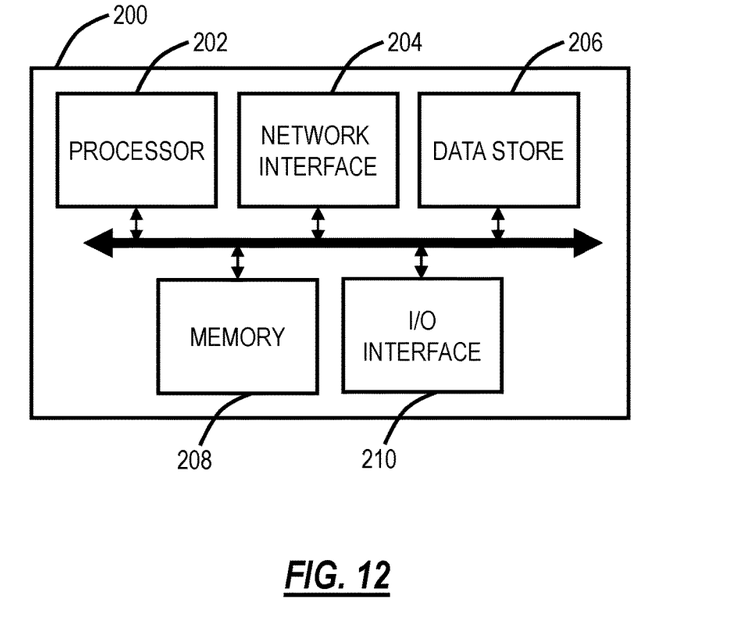
FIG. 12 is a block diagram of an example processing device, which can form a control module for the node in FIG. 11.

FIG. 12 is a block diagram of an example processing device 200, which can form a control module for the node 100, a PCE, etc. The processing device 200 can be part of the node 100, or a stand-alone device communicatively coupled to the node 100. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes, the PCE, the SDN controller, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Process

Figure 13:
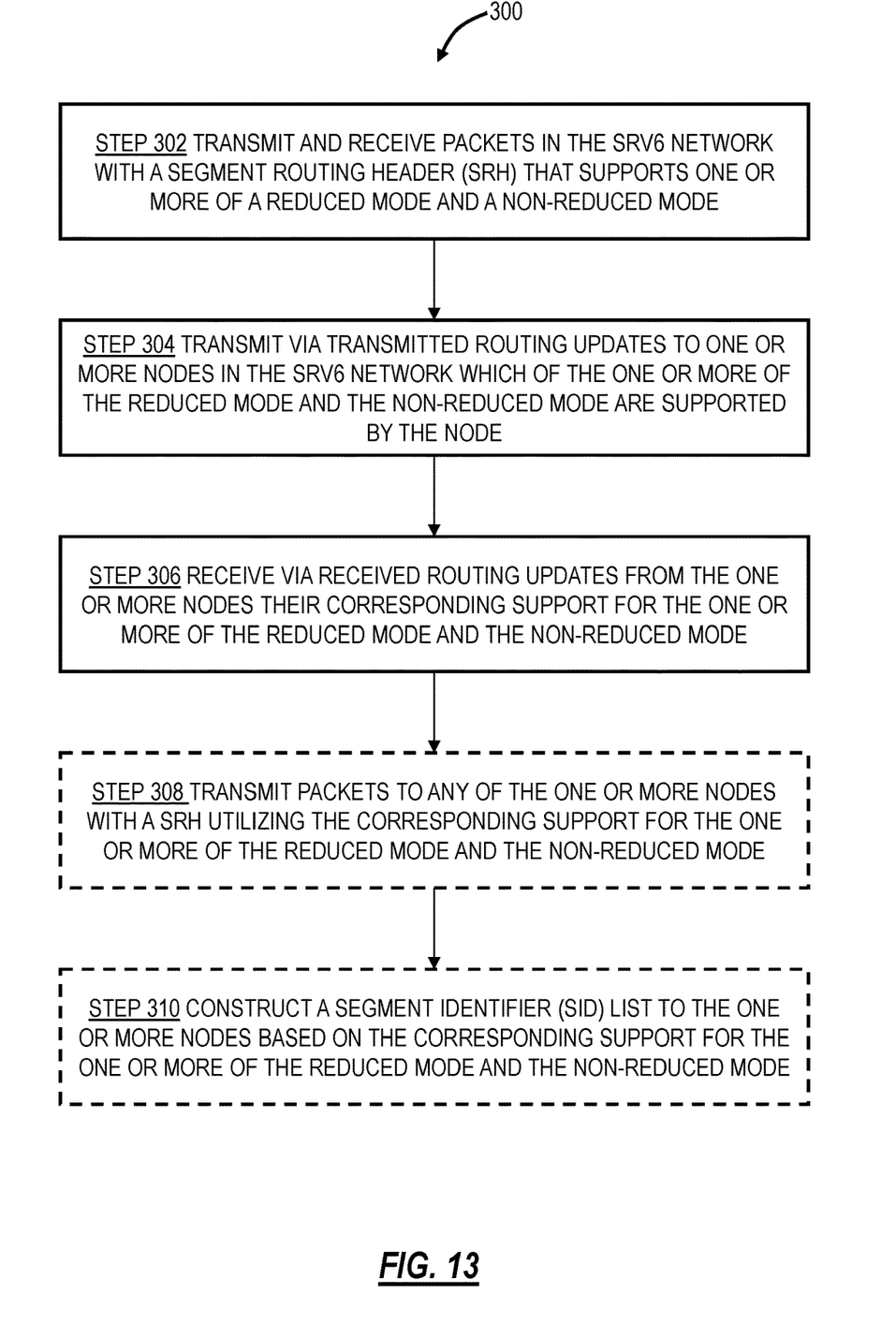
FIG. 13 is a flowchart of a process for distribution of SRv6 modes of operation via routing protocols as well as for operation with different modes.

FIG. 13 is a flowchart of a process 300 for distribution of segment routing version 6 (SRv6) modes of operation via routing protocols as well as for operation with different modes. The process 300 contemplates implementation as a method having steps, via one of the nodes 100, via circuitry configured to implement the steps, and via instructions stored in a non-transitory computer-readable medium that, when executed, cause one or more processors to implement the steps.

The process 300 includes transmitting and receiving packets in the SRv6 network with a segment routing header (SRH) that supports one or more of a Reduced mode and a Non-reduced mode (step 302), transmitting via transmitted routing updates to one or more nodes in the SRv6 network which of the one or more of the Reduced mode and the Non-reduced mode are supported by the node (step 304), and receiving via received routing updates from the one or more nodes their corresponding support for the one or more of the Reduced mode and the Non-reduced mode (step 306).

The process 300 can further include transmitting packets to any of the one or more nodes with a SRH utilizing the corresponding support for the one or more of the Reduced mode and the Non-reduced mode (step 308). The process 300 can further include constructing a segment identifier (SID) list to the one or more nodes based on the corresponding support for the one or more of the Reduced mode and the Non-reduced mode (step 310).

The node 100, implementing the process 300, can support both the Reduced mode and the Non-reduced mode. The process 300 can further include transmitting packets to a first node of the one or more nodes with a SRH utilizing the Reduced mode, and transmitting packets to a first node of the one or more nodes with a SRH utilizing the Non-reduced mode.

The transmitted and the received routing updates can include flags having values set based on the one or more of the Reduced mode and the Non-reduced mode that are supported by the node. The transmitted and the received routing updates can be via any of intermediate system-intermediate system (ISIS), open shortest path first (OSPF), interior gateway protocol (IGP), and border gateway protocol link state (BGP-LS). The transmitted and the received routing updates can include a type-length-value (TLV) or sub-TLV. The transmitted and the received routing updates can include a SRv6 locator with the one or more of the Reduced mode and the Non-reduced mode that are supported by the node indicated therein.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A node in a segment routing version 6 (SRv6) network comprising circuitry configured to:
   transmit and receive packets in the SRv6 network with a segment routing header (SRH) that supports one of a Reduced mode, a Non-reduced mode, and both the Reduced mode and the Non-reduced mode,
   transmit via transmitted routing updates to one or more nodes in the SRv6 network which of the one of the Reduced mode, the Non-reduced mode, and both the Reduced mode and the Non-reduced mode are supported by the node, and
   receive via received routing updates from the one or more nodes their corresponding support for the one of the Reduced mode, the Non-reduced mode, and both the Reduced mode and the Non-reduced mode,
   wherein the transmitted and the received routing updates include flags having values set based on the one of the Reduced mode, the Non-reduced mode, and both the Reduced mode and the Non-reduced mode supported by the node and the one or more nodes such that the flags indicate what modes are supported by the respective nodes.

2. The node of claim 1, wherein the circuitry is further configured to
   transmit packets to any of the one or more nodes with a SRH utilizing the corresponding support for the one of the Reduced mode, the Non-reduced mode, and both the Reduced mode and the Non-reduced mode supported by the node.

3. The node of claim 1, wherein the circuitry is further configured to
   construct a segment identifier (SID) list to reach the one or more nodes based on the corresponding support for the one of the Reduced mode, the Non-reduced mode, and both the Reduced mode and the Non-reduced mode supported by the node.

4. The node of claim 1, wherein the circuitry is further configured to
   transmit packets to a first node of the one or more nodes with a SRH utilizing the Reduced mode, and
   transmit packets to a second node of the one or more nodes with a SRH utilizing the Non-reduced mode.

5. The node of claim 1, wherein the transmitted and the received routing updates are via any of intermediate system-intermediate system (ISIS), open shortest path first (OSPF), interior gateway protocol (IGP), and border gateway protocol link state (BGP-LS).

6. The node of claim 1, wherein the transmitted and the received routing updates include a type-length-value (TLV) or sub-TLV.

7. The node of claim 1, wherein the transmitted and the received routing updates include a SRv6 locator with the one of the Reduced mode, the Non-reduced mode, and both the Reduced mode and the Non-reduced mode that are supported by the node indicated therein.

8. A non-transitory computer-readable medium comprising instructions that, when executed, cause circuitry to perform steps of:
   transmitting and receiving packets in a segment routing version 6 (SRv6) network with a segment routing header (SRH) that supports one of a Reduced mode, a Non-reduced mode, and both the Reduced mode and the Non-reduced mode,
   transmitting via transmitted routing updates to one or more nodes in the SRv6 network which of the one of the Reduced mode, the Non-reduced mode, and both the Reduced mode and the Non-reduced mode are supported by the node, and
   receiving via received routing updates from the one or more nodes their corresponding support for the one of the Reduced mode, the Non-reduced mode, and both the Reduced mode and the Non-reduced mode,
   wherein the transmitted and the received routing updates include flags having values set based on the one of the Reduced mode, the Non-reduced mode, and both the Reduced mode and the Non-reduced mode supported by the node and the one or more nodes such that the flags indicate what modes are supported by the respective nodes.

9. The non-transitory computer-readable medium of claim 8, wherein the steps further include
   transmitting packets to any of the one or more nodes with a SRH utilizing the corresponding support for the one of the Reduced mode, the Non-reduced mode, and both the Reduced mode and the Non-reduced mode.

10. The non-transitory computer-readable medium of claim 8, wherein the steps further include
    constructing a segment identifier (SID) list to reach the one or more nodes based on the corresponding support for the one of the Reduced mode, the Non-reduced mode, and both the Reduced mode and the Non-reduced mode.

11. The non-transitory computer-readable medium of claim 8, wherein the transmitted and the received routing updates are any of via any of intermediate system-intermediate system (ISIS), open shortest path first (OSPF), interior gateway protocol (IGP), and border gateway protocol link state (BGP-LS), via a type-length-value (TLV) or sub-TLV, and via a SRv6 locator with the one of the Reduced mode, the Non-reduced mode, and both the Reduced mode and the Non-reduced mode that are supported by the node indicated therein.

12. A method comprising steps of:

transmitting and receiving packets in a segment routing version 6 (SRv6) network with a segment routing header (SRH) that supports one of a Reduced mode, a Non-reduced mode, and both the Reduced mode and the Non-reduced mode, transmitting via transmitted routing updates to one or more nodes in the SRv6 network which of the one of the Reduced mode, the Non-reduced mode are supported by the node, and both the Reduced mode and the Non-reduced mode, and receiving via received routing updates from the one or more nodes their corresponding support for the one of the Reduced mode, the Non-reduced mode, and both the Reduced mode and the Non-reduced mode, wherein the transmitted and the received routing updates include flags having values set based on the one of the Reduced mode, the Non-reduced mode, and both the Reduced mode and the Non-reduced mode supported by the node and the one or more node such that the flags indicate what modes are supported by the respective nodes.

13. The method of claim 12, wherein the steps further include transmitting packets to any of the one or more nodes with a SRH utilizing the corresponding support for the one of the Reduced mode, the Non-reduced mode, and both the Reduced mode and the Non-reduced mode.

14. The method of claim 12, wherein the steps further include constructing a segment identifier (SID) list to reach the one or more nodes based on the corresponding support for the one of the Reduced mode, the Non-reduced mode, and both the Reduced mode and the Non-reduced mode.

15. The method of claim 12, wherein the transmitted and the received routing updates are any of via any of intermediate system-intermediate system (ISIS), open shortest path first (OSPF), interior gateway protocol (IGP), and border gateway protocol link state (BGP-LS), via a type-length-value (TLV) or sub-TLV, and via a SRv6 locator with the one of the Reduced mode, the Non-reduced mode, and both the Reduced mode and the Non-reduced mode that are supported by the node indicated therein.

* * * * *